(12) United States Patent
Masinter et al.

(10) Patent No.: US 7,945,784 B1
(45) Date of Patent: May 17, 2011

(54) METHOD AND SYSTEM TO PERFORM SECRET SHARING

(75) Inventors: Larry Masinter, Los Altos, CA (US); Michael J. Welch, Simi Valley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1436 days.

(21) Appl. No.: 11/207,358

(22) Filed: Aug. 19, 2005

(51) Int. Cl.
*H04L 9/32* (2006.01)
(52) U.S. Cl. .......................................... 713/180; 380/28
(58) Field of Classification Search .................. 380/286; 713/180
See application file for complete search history.

(56) References Cited

U.S. PATENT DOCUMENTS

| 4,891,781 | A * | 1/1990 | Omura | 708/670 |
| 6,363,481 | B1 * | 3/2002 | Hardjono | 713/165 |
| 2002/0176573 | A1 * | 11/2002 | Futa et al. | 380/44 |
| 2003/0091192 | A1 * | 5/2003 | Chen et al. | 380/277 |
| 2004/0220967 | A1 * | 11/2004 | Kryka et al. | 707/104.1 |

OTHER PUBLICATIONS

Karnin et al., On Secret Sharing Systems, IEEE Transaction on Information Theory, vol. IT-29, No. 1 Jan. 1983.*
Lin, C. C. and Tsai, W.H., Secret image sharing with capability of share data reduction. Optical Engineering, vol. 42, 2340-2345, Aug. 2003.*
Beguin, P., "General short computational secret sharing schemes", *Advances in Cryptolog—EUROCRYPT '95*, vol. 921 of LNCS, (1995),194-208.
Blundo, C., "Secret Sharing Schemes with Veto Capabilities", *Proceedings of the French-Israeli Workshop in Algebraic Coding, Lecture Notes in Computer Science*, vol. 781, (1994),82-89.
Cramer, Ronald, "Efficient Multi-Party Computation over Rings", *Proc. of EUROCRYPT '03, LNCS*, (2003),1-21.
Cramer, Ronald, "General Secure Multi-Party Computation from any Linear Secret Sharing Scheme", *Proceedings of EUROCRYPT '00, Springer LNCS*, (May 2000),1-25.
Gennaro, Rosario, "Simplified VSS and fast-track multiparty computations with applications to threshold cryptography", *Proceedings of the Seventeenth Annual ACM Symposium on Principles of Distributed Computing*, (1998),101-111.
Rabin, Michael O., "Efficient dispersal of information for security, load balancing and Fault Tolerance", *Journal of the Association for Computing Machinery*, 36(2), (Apr. 1997),335-348.
Shamir, Adi, "How to share a secret", *Communications of the ACM*, 22(11), (Nov. 1979),612-613.
Simmons, G. J., "An introduction to shared secret and/or shared control schemes and their application", *In: Contemporary Cryptography. The Science of Information Integrity*, IEEE Press, Chapter 9,(1991),441-497.

* cited by examiner

*Primary Examiner* — Gilberto Barron, Jr.
*Assistant Examiner* — Virginia Ho
(74) *Attorney, Agent, or Firm* — Schwegman Lunberg & Woessner, P.A.

(57) ABSTRACT

A method and a system is provided to process data. For example, the method and system may be used to store (e.g., archive) documents. In an embodiment, the method comprises receiving a quantum of data and creating n data pieces of size s from the quantum of data. The method may comprise generating k random numbers of size s, wherein k defines a minimum number of processed data pieces required to reconstruct the quantum of data, and performing polynomial arithmetic modulo prime on the n data pieces. The polynomial arithmetic may utilize polynomial of order k and the prime may be selected based on a bit processing capability of a processor used to process the data. The prime may be $2^8+1$ when the bit processing capability of a processor is 16 bits and $2^{16}+1$ when the bit processing capability of a processor is 32 bits.

20 Claims, 8 Drawing Sheets

```
byte[] iCoef = new byte[threshold-1];    // holds the random coefficients of the polynomial
while ((bytesRead = secretstream.read(secretBuffer)) > 0) { int numOverflowBytes = (bytesRead + 7) / 8;   // number of bytes we need to store the overflow bits for (int secretByteNum = 0; secretByteNum < bytesRead; secretByteNum++) {

// secret is the next secret byte value to generate shares for
        int secret = secretBuffer[secretByteNum] & 0xff;  // byte -> non-neg integer // generate the coefficients for the random polynomial
        // Note that this chooses values between 0 and 255
        // (we use +1 below for 1 to 256). This eliminates the
        // case where all (or any) of the coefficients are 0.
        srand.nextBytes(iCoef);

// compute f(x) of this secret for each share
        for (int x = 0; x < numShares; x++) {
            int val = secret;
            int pow = x + 1;
            for (int term = 0; term < threshold - 1; term++) {
                val = (val + ((iCoef[term] & 0xff) + 1) * pow) % PRIME;
                pow = (pow * (x + 1)) % PRIME;
            }

// store the 8 bit value of val in this share's buffer
            shareBuffers[x][secretByteNum] = (byte) (val & 0xff);
            if (val == PRIME - 1) {
                // val == PRIME-1 is the overflow condition, so we need to set the
                // appropriate bit here to differentiate between 256 and 0
                overflowBuffers[x][secretByteNum / 8] |= (byte) (1 << secretByteNum % 8);
            }
        }
    }

// shareBuffers[x] now holds the least significant 8 bits of each f(x) value
    // overflowBuffers[x] now holds the msb for each f(x) value to differentiate 0 and 256
    // write the buffered data to each share stream
    for (int shareNum = 0; shareNum < numShares; shareNum++) {
        // write the buffer size to the share
        sharestreams[shareNum].write(bytesRead >> 8);
        sharestreams[shareNum].write(bytesRead & 0xff);
        // write the share data buffers
        sharestreams[shareNum].write(shareBuffers[shareNum], 0, bytesRead);
        // write the overflow data buffers
        sharestreams[shareNum].write(overflowBuffers[shareNum], 0, numOverflowBytes);
    }
}
```

```
// compute the coefficients for Lagrange interpolation of this secret
int[] iCoef = new int[threshold];
for (int i = 0; i < threshold; i++) {
    int prod = 1;
    for (int shareNum = 0; shareNum < threshold; shareNum++) {
        if (shareNum != i) {
            int val = xvalues[shareNum];
            int dif = ((val - xvalues[i]) + PRIME) % PRIME;
            prod = (prod * divTable[val][dif]) % PRIME;
        }
    }
    iCoef[i] = prod;
} int[][] yvalues = new int[threshold][MAX_BUFFER_SIZE];
int[][] ovalues = new int[threshold][MAX_BUFFER_SIZE];
do {
    // read the buffer size from the shares
    int bytesToRead = getBufferSize(shareStreams[0]);
    for (int shareNum = 1; shareNum < threshold; shareNum++) {
        assert(bytesToRead == getBufferSize(shareStreams[shareNum]));
```

110

FIG. 7

METHOD AND SYSTEM TO PERFORM SECRET SHARING

TECHNICAL FIELD

The present application relates generally to the technical field of secret sharing. For example, an embodiment of the invention relates to document storage using secret sharing.

BACKGROUND

Electronic documents may be stored for various reasons. For example, documents may be stored (e.g., archived) to make the documents readily available, for future use, to comply with legal document retention requirements and so on. Documents may be stored in a both a secure and non-secure fashion. In certain circumstances, in order to store documents in a secure fashion various different encryption techniques may be used. Typically such techniques require the use of a private/public key pair.

SUMMARY

According to one example embodiment, there is provided a system and a method to process documents, for example, to process documents for archiving. In an embodiment, the method comprises receiving a quantum of data and creating n data pieces of size s from the quantum of data. The method may comprise generating k random numbers of size s, wherein k defines a minimum number of processed data pieces required to reconstruct the quantum of data (e.g., an archived document), and performing polynomial arithmetic modulo prime on the n data pieces. The polynomial arithmetic may utilize a polynomial of order k and the prime may be selected based on a bit processing capability of a processor used to process the data.

Other features will be apparent from the accompanying drawings and from the detailed description that follows.

BRIEF DESCRIPTION OF THE DRAWINGS

Embodiments of the present invention are illustrated by way of example and not limitation in the figures of the accompanying drawings, and in which like references indicate the same or similar elements.

In the drawings,

FIG. 4 shows example Java code of a method, in accordance with an example embodiment, for creating an archived document;

FIG. 7 shows example Java code of a method, in accordance with an example embodiment, for reconstructing or generating a document from an archived document.

DETAILED DESCRIPTION

A method and system to process data are described. In the following description, for purposes of explanation, numerous specific details are set forth in order to provide a thorough understanding of embodiments of the present invention. It will be evident, however, to one skilled in the art that the present invention may be practiced without these specific details.

In secret sharing, data is divided into a selected number of parts or pieces in such a way so that the original data may be recovered or reconstructed from some (not necessarily all) of the selected number of parts. Thus, data D may be divided into n pieces (e.g., equal in size to D) in such a way that the data D can be recovered from any k pieces where k is less than n). Thus, the data D can be reconstructed from less than the total number of pieces n, but a minimum of k pieces is required to recreate the original data D. Knowledge of k−1 pieces may provide no information at all about the data.

Creating Archived Data from a Document

Figure 1:
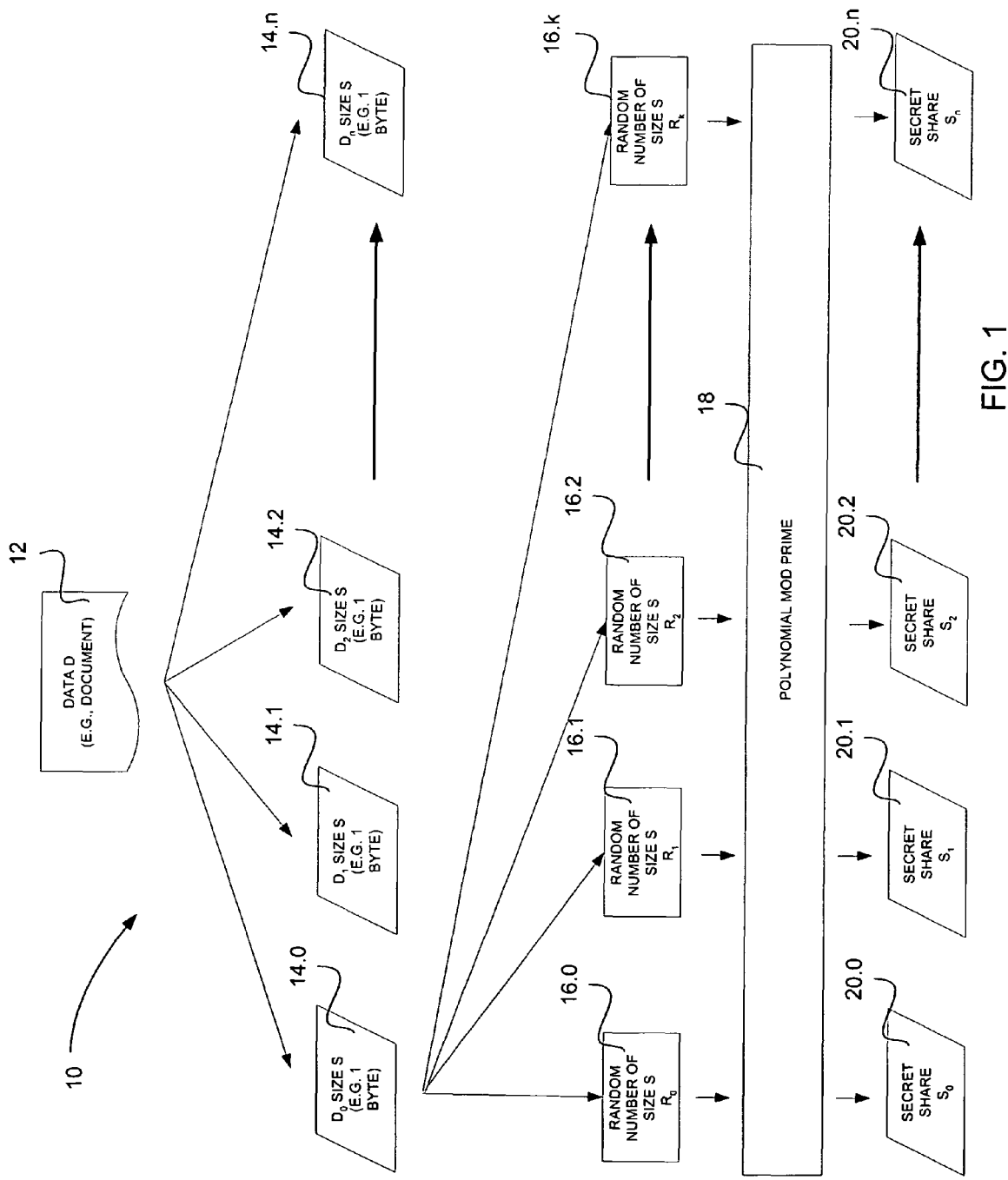
FIG. 1 shows schematic representation of a method, in accordance with an embodiment, for archiving documents.

In accordance with an embodiment, a method and system of archiving documents is provided utilizing secret sharing. In FIG. 1, reference 10 generally indicates a schematic representation of a method, in accordance with an embodiment, for archiving documents. Each document 12 to be archived is divided up into n pieces or parts 14.1-14.$n$ (document pieces $D_0$-$D_n$). As described in more detail below, using k random numbers 16.1-16.$k$ and a polynomial mod prime processing module 18, n secret pieces 20.0-20.$n$ are generated. A threshold number of k secret pieces of the total of n pieces 20.0-20.$n$ are required to reconstruct the archived document 12. Thus, the original document 12 may be recovered even if some parts or pieces are no longer available (e.g., due hardware failure). This method differs from RAID storage systems in that each secret piece 20.0-20.$n$ provides no information whatsoever about the whole (the archived document 12) and each secret piece 20.0-20.$n$ only has meaning or value when in combination with the threshold number of pieces (k secret pieces). As an individual secret piece does not contain any information, and is not an actual part of the original document 12, it need not be securely stored as access to less that the threshold k of secret pieces 20.0-20.$n$ provides no information.

Figure 2:
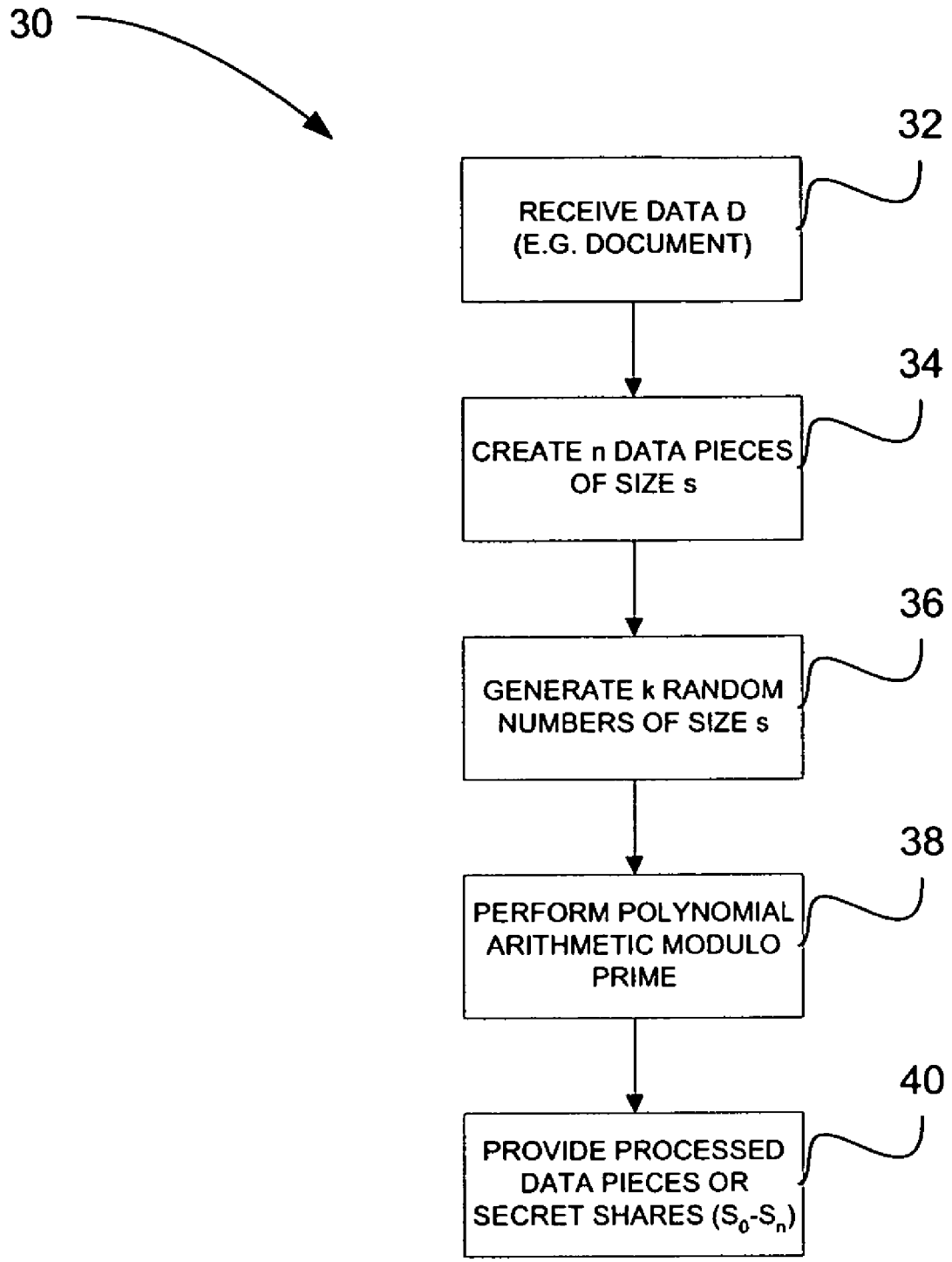
FIG. 2 shows an exemplary flow diagram of a method, in accordance with an embodiment, for archiving a document.
Figure 3:
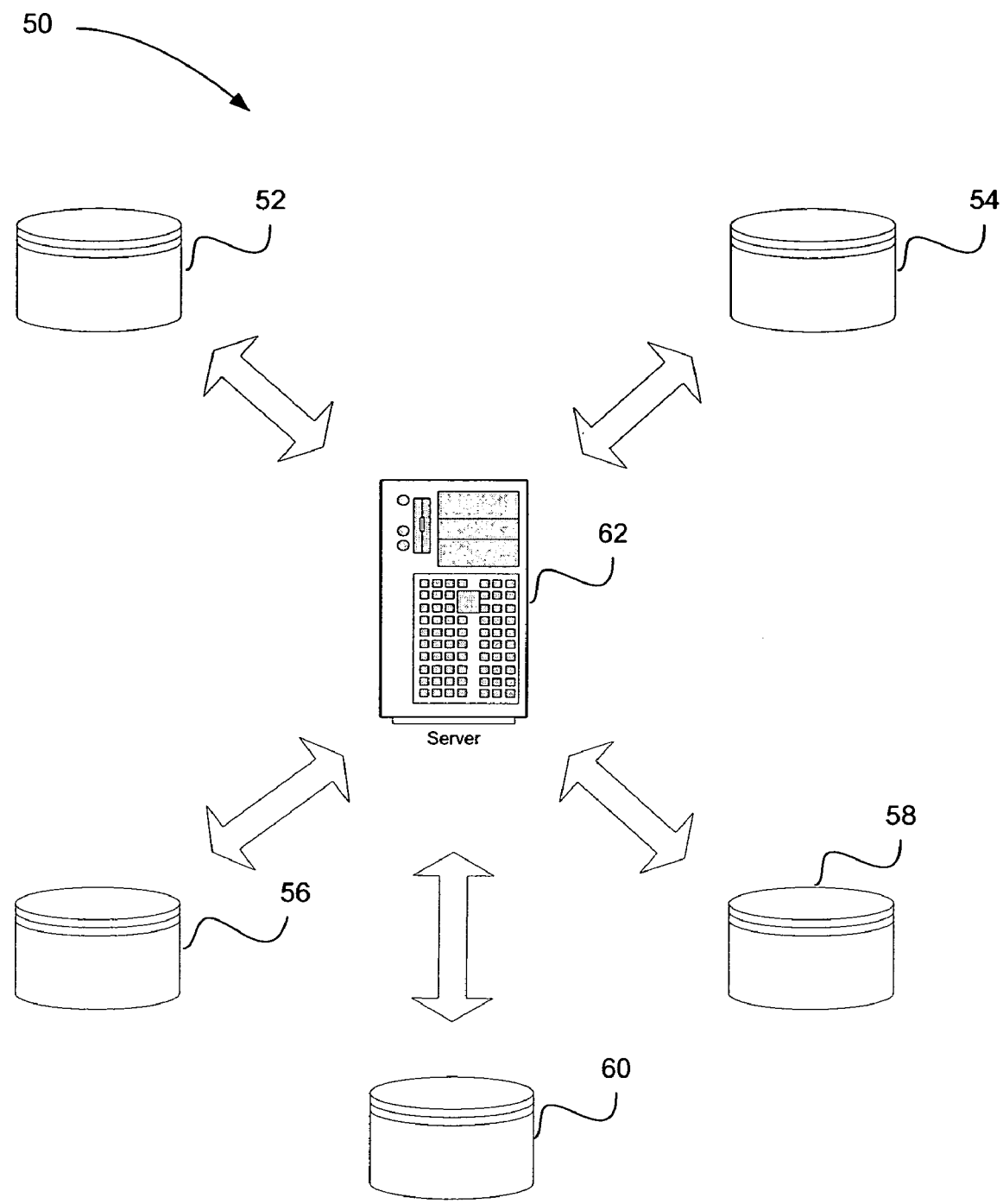
FIG. 3 shows an example system including a server and a databases for storing archived documents.

Referring to FIG. 2, reference 30 generally indicates a method, in accordance with an embodiment, for archiving a document (e.g., the document 12). The method 30 is shown to receive the document 12 at block 32. The document 12 may be viewed as a stream of bits and, accordingly, the bit stream may be sequentially or serially divided into n data pieces (see block 34) by serially dividing up the bit stream. In an embodiment, the size s of each data piece is chosen as 1 byte (8 bits). Thus, the document 12 is divided into a string of 8 bit groups or pieces. Thereafter, k random numbers of size s (1 byte in the given example) are generated as shown at block 36. The number k may define a minimum number of the processed data pieces or secrets 20.0-20.$n$ required to reconstruct the document 12. The number k and n may be inputs to the method 30 or be defined during execution of the method 30. Thereafter, and as described in more detail below, polynomial arithmetic modulo prime (see block 38) is performed using a polynomial of order k to generate the secrets 20.0-20.$n$. As shown at block 40, the processed pieces of data or secrets 20.0-20.$n$ that are required to reconstruct the document 12 may be stored in one or more databases. For example, as shown in FIG. 3 any one or more secrets 20.0-20.$n$ may be stored on any one or more of the example databases 52-60. A server 62 is shown to be in communication with the databases 52-60.

Thus, in this example, in order to archive a document 12, a polynomial is defined which can be reconstructed with a minimum of k processed data pieces or secrets. As described in more detail below, interpolation techniques may be used in order to recover the polynomial. The recovered polynomial may then be used to derive the data pieces 14.0-14.$n$ that may then be combined to provide the original document 12. In an embodiment, LeGrange interpolation is used. When the polynomial has been recovered, an integer value corresponding to the original data piece 14.0-14.$n$ may then be determined from the polynomial. The integer value may be a point at which the polynomial crosses the Y-axis and thus the polynomial value at x=0 may be determined. In the given example, 1 byte data pieces are selected and thus integers between 0 and 255 may be used to represent data pieces or secrets. The original document may be reconstructed using the binary equivalent of the integer value.

Returning to the polynomial mod prime processing module 18, the polynomial may be a random k−1 degree polynomial and for each data piece $D_0$-$D_n$ (i=0→n):

$$q(x)=a[0]+a[1]*x+\ldots a[k-1]*x^{(k-1)} \text{modulo prime}$$

in which
a[0]=$D_i$;
a[1]-a[k−1] are the random numbers $R_0$-$R_k$; and
prime is a prime number selected based on a bit processing capability of a processor used to process the data. In an embodiment, the prime is a Fermat prime (a prime in the form $(2^2{}^N)+1$) such as 3, 5, 17, 257 and 26637.

The value of each processed data piece/secret/secret share ($S_0$-$S_n$) may be determined as follows:

$$D_1=q(1),\ldots,D_i=q(i),\ldots,D_n=q(n).$$

As mentioned above, in one embodiment, the prime number is selected based on the bit processing capability of a processor used to process the data. In an example embodiment, when the processor is a 16-bit processor, the prime is selected as 257 ($2^8$+1) and when the processor is a 32-bit processor the prime number is selected as the prime is selected as 65 537 ($2^{16}$+1). The prime number is chosen dependent upon the processor so as to at least reduce, and possibly avoid, any overflows in the processor. If a smaller prime number is chosen, it would result in additional computation time thereby slowing down the document archiving process. For example, choosing a smaller prime may require additional shifting and masking by the processor and may thus be more computationally intensive and may be more complicated. Larger prime number may result in processor overflows. Thus, computational efficiency may be achieved selecting a prime number based on the processing capabilities of the processor used to process the data.

In an embodiment, each byte in the document 12 may correspond to a secret 20.0-20.11. Accordingly, an archived document may comprise a plurality of bytes each of which corresponds to a secret or processed data piece. The archived document may be broken up into a number of sub-documents and stored in different database wherein a combination of at least some of these documents provides the minimum number of secrets to recover the document. A threshold K and a number of secrets to generate N may be chosen. For each byte in an original document, a new set of random coefficients for a polynomial of order K−1 may be generated, and q(x) for each share x from 1 to N may be computed. Share x may contain q(x) for each byte in the original document, so that any K of these shares can be used to interpolate the coefficients used for each byte and reconstruct the original document. At least K shares of each q(x) value may be recovered to recover all of the bytes.

An example embodiment of a method 70 (see FIG. 4) for creating an archived document is shown. In the method 70, n secrets or processed pieces are created. The example shows example Java code and may be a system call to generate the secrets from data pieces 14.0-14.$n$. In the given example "numshares" corresponds to the number of data pieces n described above. An integer value ("val") is obtained that defines the secret ($S_1$-$S_n$). In the example embodiment, operation "((iCoeff[term] & 0xff)+1)" is included to avoid zero values. Thus, in an example embodiment, a sequence of bytes may be generated (the random number corresponding to $R_0$-$R_k$ above) to provide coefficients in the polynomial to be random bytes with values between 1 and 256 and not 0 and 255. This avoids having coefficient values of "0" in which case the data (or text of the document in the given example) in the clear. Thus, in the example embodiment, "sRand" generates k random coefficients in the range 0-255 (or −256 as "1" is added) which are the coefficients a[i] described in the q(x) equation set out above. In an embodiment, choosing the prime number as 257 results in only two modulo computations per iteration thereby saving computations and enhancing the speed at which the document 12 may be archived.

Thus, in an example, a prime number is selected or chosen so that it is small or low enough to do a multiply wherein the result of the multiply modulo does not generate an overflow in the processor. The prime should also be large enough that a natural computational value, a natural chunk of data or piece of data ($D_0$-$D_n$) is smaller than the prime number selected. When the prime number is 257, the chunk or piece of data 14.0-14.$n$ may be 1 byte in size. For example, if the prime selected is substantially bigger than 1 byte in size, this may result in a substantial number of values that overflow during processing. This may increase the size of the archived document. In certain circumstances, some values generated during computation may not fit into a single byte resulting in a slightly increased file size during archiving.

In the example embodiment in FIG. 4, any overflow may be stored in a buffer (shareBuffers). For example, in the case where the value of the polynomial is computed and the result was 257 an overflow condition may be defined. A record may be kept of which bytes are bigger than 257. The result is a vector with values between zero and 257 and, accordingly, the result does not fit into a byte and an overflow buffer is then created. In an example embodiment, shareBuffers is where the computed value of the polynomial 'val' is stored, and is a byte with numeric range 0-255. An embodiment using modular-257 arithmetic, provides a range of possible values between 0-256, and avoidance of the possibility of numeric value 256=(100000000) binary may be desired. When stored in an 8 bit (1 byte) field, this value is considered equivalent to 0 (00000000 binary). Accordingly, this 9th bit for each byte is stored to differentiate between 0 and 256. This extra bit may be stored in an overflowBuffers field.

Reconstructing the Original Document from an Archived/Processed Document

Figure 5:
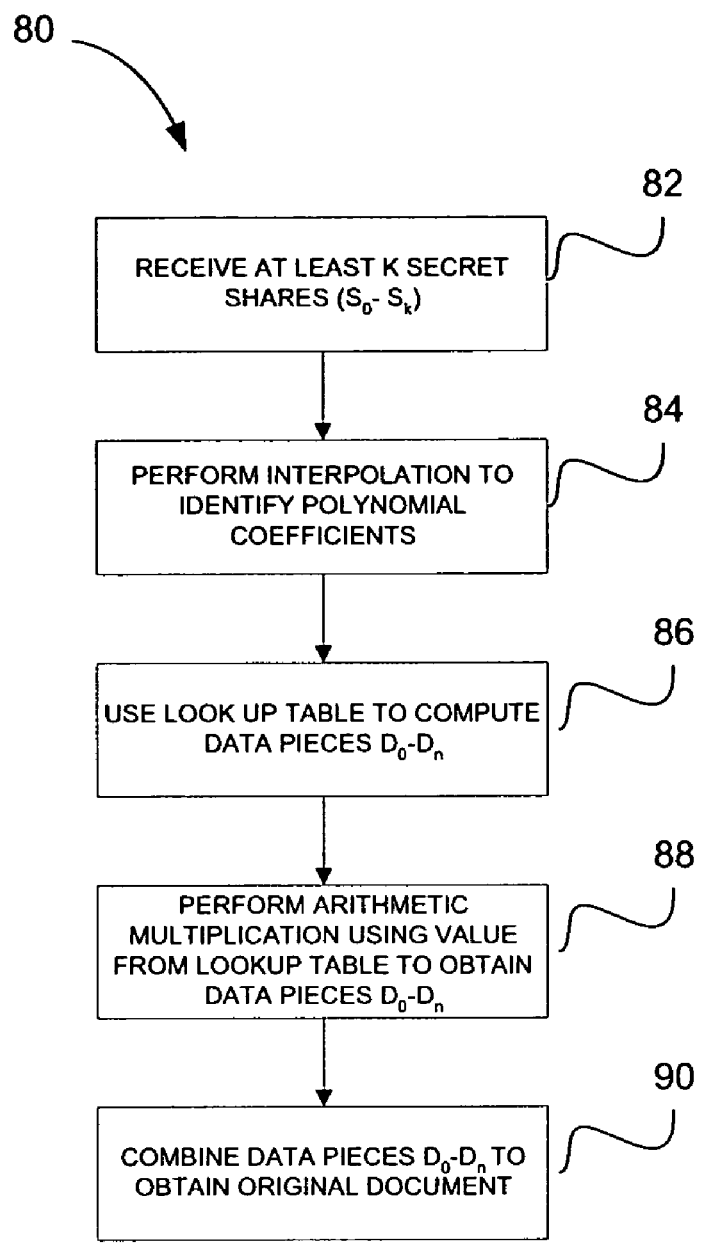
FIG. 5 shows a flow diagram of a method, in accordance with an example embodiment, to recover or reconstruct a document from an archived or processed document.

In order to recover or reconstruct the document 12, each data piece 14.0-14.$n$ must be generated and the n data pieces 14.0-14.$n$ may then be combined (e.g., serially) to render the original document 12. Following on the example above, In FIG. 5 reference 80 generally indicates a method, in accordance with an embodiment, to recover or reconstruct a document from an archived or processed document. Applying the method 80 to document 12 in FIG. 1, At block 82 a processed document comprising at least k secrets or secret shares ($S_0$-$S_k$) may be received or retrieved by a server (e.g., the server 62). Thereafter, as shown at block 84 polynomial interpolation (see block 84) may be performed using the k points (the minimum number of pieces to reconstruct the data $D_0$-$D_n$).

In an embodiment, LeGrange interpolation is used to identify the coefficients of the polynomial. For the example provided above, the LeGrange interpolation may be used to determine the coefficients of the equation $q(x)=a[0]+a[1]*x+\ldots a[k-1]*x(k-1)$ modulo prime. Once the equation has been identified, its value at $x=0$ may be determined to recover each original data piece 14.0-14.$n$ ($D_0$-$D_n$). Thus, an integer between 0 and 256 may inserted into the equation and the binary equivalent of the resultant value then provides the data (8 bits) of the relevant part of the document 12. Returning to the example, above the document 12 may be reconstructed as follows:

Document 12=$D_1$=$q(1)$+ . . . ,$D_i$=$q(i)$, . . . ,$D_n$=$q(n)$.

It will be appreciated that knowledge of k−1 or less of the integer values of $S_0$-$S_n$ does not provide sufficient information or data to determine the polynomial and hence reconstruct the document 12.

Figure 6:
FIG. 6 shows an example modulo prime table.

In one example embodiment, in order to enhance the computation speed in recovering a document, a lookup table is used to perform the modulo arithmetic. When the prime is selected as 257 ($2^8$+1) a PRIME×PRIME table may be created. An example of such a table 100 is shown in FIG. 6. Thus, as division operations may be significantly slower than a table lookup, an embodiment may pre-compute the entire division table and transform the required modular division into a table lookup.

In an embodiment, when the prime is 65 537 ($2^{16}$+1), a table corresponding to the table 100 may be provided but include 65 537 entries and form a reference inverse table wherein each entry in the table is a value corresponding to "a" divided by "b" mod which, when the prime is chosen as 65 357 (corresponding to a 32-bit processor), becomes a divided by b mod 65 357. Accordingly, during reconstruction of the document 12, this division table may be used and results may be looked up instead of being computed there enhancing the reconstruction speed of the document 12 as time consuming division need not be performed. A modified Euclid algorithm may be used to compute 1/N MOD PRIME for each N.

Thus, an inverse table corresponding to the selected prime may be pre-computed in order to enhance processing speeds when the document 12 is reconstructed. When computing the data pieces 14.1-14.$n$ a multiply function may be using to multiply a valued obtained from the lookup table. In the example described above, the built in arithmetic capabilities of the processor or Central Processing Unit (CPU) are used to perform a multiplication (document recovery or reconstruction functionality) based on a value that is looked up which may be computationally more efficient that doing modulo arithmetic. Selection of the prime based on the processing power of the CPU may at least reduce any CPU overflow during a multiply operation. It will be appreciated that although the embodiments are described with reference to 16-bit and 32-bit processors, processors having different processing bit capabilities may be used and the prime number may then be chosen based on the capabilities of the processor.

An example embodiment of a method 110 (see FIG. 7) for reconstructing or generating a document (original document) from an archived document is shown. The example shows example Java code and may be a system call to process k data pieces or secret shares $S_0$-$S_k$ thereby to recover or reconstruct the original document 12. For each of the data pieces $D_0$-$D_n$ to reconstruct, an integer value is determined using a lookup table ("divtable").

Although an example document archiving method and system has been described, it will be appreciated that the invention may be deployed in any other environment when secret sharing is deployed, for example, in the management of cryptographic keys, or any other data processing system where a threshold of parts or pieces is required to reconstruct the original data. Further, although the method and system have been described, by way of example, using a polynomial in the secret sharing, it will be appreciated to a person of skill in the art that any other functions or mathematical operations may be used.

Figure 8:
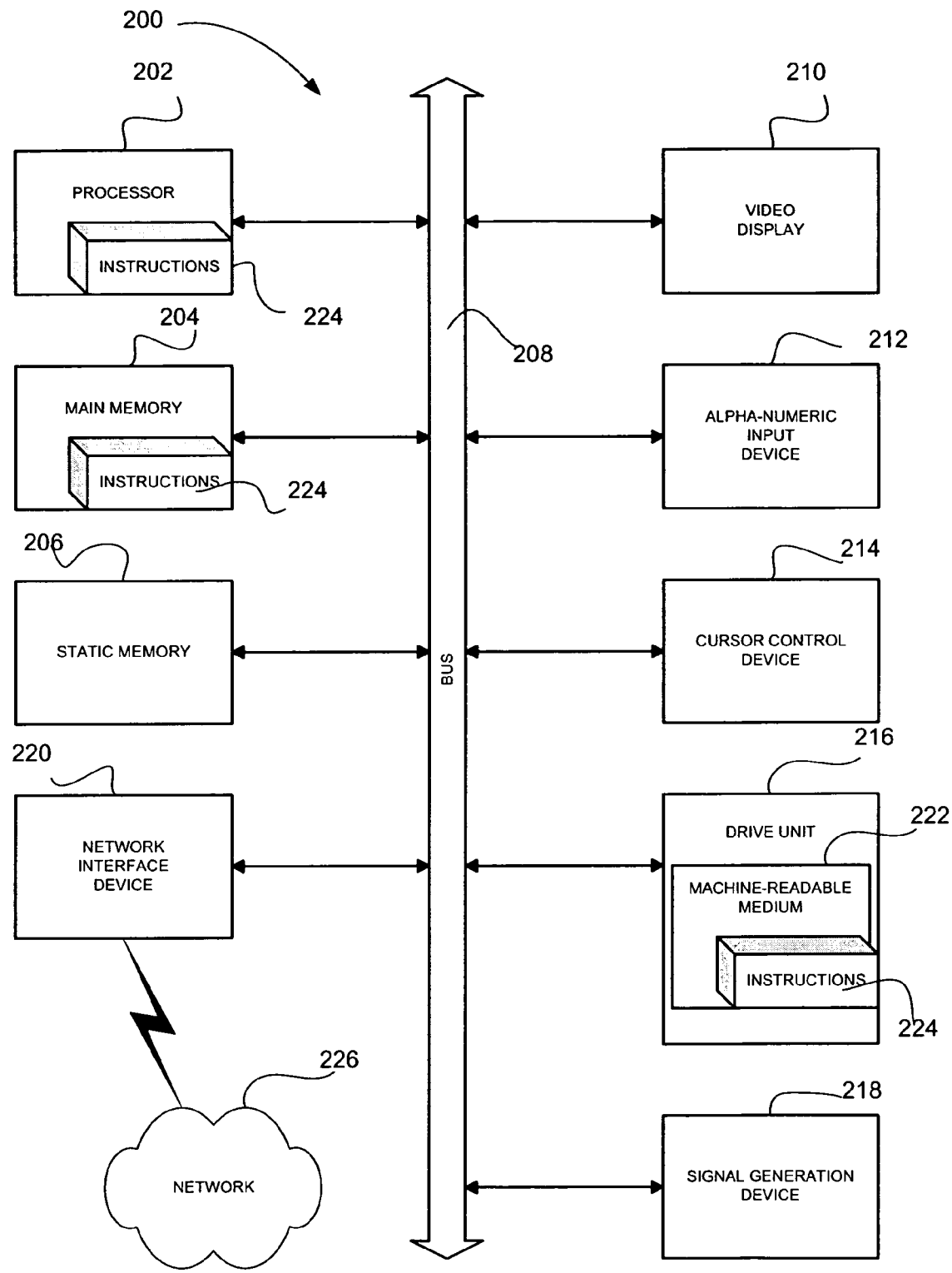
FIG. 8 shows a diagrammatic representation of a machine in the example form of a computer system for performing any one or more of the methodologies discussed herein.

FIG. 8 shows a diagrammatic representation of machine in the example form of a computer system 200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to comprise any collection of machines that individually or jointly execute a set (or multiple sets) of instructions to perform any one or more of the methodologies discussed herein.

The example computer system 200 comprises a processor 202 (e.g., a central processing unit (CPU) a graphics processing unit (GPU) or both), a main memory 204 and a static memory 206, which communicate with each other via a bus 208. The computer system 200 may further comprise a video display unit 210 (e.g., a liquid crystal display (LCD) or a cathode ray tube (CRT)). The computer system 200 also comprises an alphanumeric input device 212 (e.g., a keyboard), a cursor control device 214 (e.g., a mouse), a disk drive unit 216, a signal generation device 218 (e.g., a speaker) and a network interface device 220.

The disk drive unit 216 comprises a machine-readable medium 222 on which is stored one or more sets of instructions (e.g., software 224) embodying any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220.

While the machine-readable medium 222 is shown in an example embodiment to be a single medium, the term "machine-readable medium" should be taken to comprise a single medium or multiple media (e.g., a centralized or distributed database, and/or associated caches and servers) that store the one or more sets of instructions. The term "machine-readable medium" shall also be taken to comprise any medium that is capable of storing, encoding or carrying a set of instructions for execution by the machine and that cause the machine to perform any one or more of the methodologies of the present invention. The term "machine-readable medium" shall accordingly be taken to comprise, but not be limited to, solid-state memories, optical and magnetic media, and carrier wave signals.

Thus, a method and system to process data (e.g., archive documents) have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of processing data, the method comprising:
receiving a quantum of data, the quantum of data representing a document;
creating n data pieces of size s from the quantum of data;
generating k random numbers of size s, with k defining a minimum number of processed data pieces required to reconstruct the quantum of data; and
performing, using one or more processors, polynomial arithmetic modulo prime on the n data pieces, the polynomial arithmetic utilizing a polynomial of order k and the prime being selected based on a bit processing capability of a processor used to process the data, the prime being a value equal to (base 2 raised to a factor)+1, the factor being a value of the bit processing capability of the processor divided by 2.

2. The method of claim 1, wherein the quantum of data is an electronic document for storage and the document is broken up into n data pieces.

3. The method of claim 1, wherein each of the k data pieces is 1 byte.

4. The method of claim 1, in which the prime is $2^8+1$ when the bit processing capability of a processor is 16 bits.

5. The method of claim 1, in which the prime is $2^{16}+1$ when the bit processing capability of a processor is 32 bits.

6. The method of claim 1, which comprises retrieving n, k and a vector including the n data pieces.

7. The method of claim 1, wherein the n data pieces are combined to form an archived document.

8. A machine-readable storage medium comprising instructions which, when executed by a machine, cause the machine to perform a method of processing data, the method comprising:
receiving a quantum of data, the quantum of data representing a document;
creating n data pieces of size s from the quantum of data;
generating k random numbers of size s, with k defining a minimum number of processed data pieces required to reconstruct the quantum of data; and
performing polynomial arithmetic modulo prime on the n data pieces, the polynomial arithmetic utilizing a polynomial of order k and the prime being selected based on a bit processing capability of a processor used to process the data, the prime being a value y equal to (a base 2 raised to a factor)+1, the factor being a value of the bit processing capability of the processor divided by 2.

9. A data storage system to store documents, the system comprising:
at least one server to receive a document and create n data pieces of size s from the document, the server including a processor to:
generate k random numbers of size s, wherein k defines a minimum number of processed data pieces required to reconstruct the document and the server performs polynomial arithmetic modulo prime on the n data pieces to generate a storage document, and the polynomial arithmetic utilizes a polynomial of order k and the prime being selected based on a bit processing capability of the processor, the prime being a value equal to (a base 2 raised to a factor)+1, the factor being a value of the bit processing capability of the processor divided by 2; and
at least one database to store the processed data pieces.

10. The system of claim 9, in which the processor is a 16-bit processor and the prime is $2^8+1$.

11. The system of claim 9, in which the processor is a 32-bit processor and the prime is $2^{16}+1$.

12. A method of processing data, the method comprising:
receiving at least k processed data pieces of size s;
for each data piece,
performing interpolation to identify a polynomial mod prime of order k−1, the prime being selected based on a bit processing capability of a processor used to process the data, the prime being a value equal to (a base 2 raised to a factor)+1, the factor being a value of the bit processing capability of the processor divided by 2;
using the polynomial to identify an original data piece corresponding to the processed data piece; and
combining, using one or more processors, original data pieces to provide an original quantum of data, the original quantum of data representing a document.

13. The method of claim 12, wherein the quantum of data is an electronic document for storage and the document is broken up into n data pieces.

14. The method of claim 12, wherein each of the k data pieces is 1 byte.

15. The method of claim 12, in which the prime is $2^8+1$ when the bit processing capability of a processor is 16 bits.

16. The method of claim 12, in which the prime is $2^{16}+1$ when the bit processing capability of a processor is 32 bits.

17. A machine-readable storage medium comprising instructions which, when executed by a machine, cause the machine to perform a method of processing data, the method comprising:
receiving at least k processed data pieces of size s;
for each data piece,
performing interpolation to identify a polynomial mod prime of order k−1, the prime being selected based on a bit processing capability of a processor used to process the data, the prime being a value equal to (a base 2 raised to a factor)+1, the factor being a value of the bit processing capability of the processor divided by 2;
using the polynomial to identify an original data piece corresponding to the processed data piece; and
combining original data pieces to provide an original quantum of data, the original quantum of data representing a document.

18. A data storage system to store documents, the system comprising:
at least one server to receive a stored document comprising at least k processed data pieces of size s, the server comprising a processor to:
for each data piece,
perform interpolation to identify a polynomial mod prime of order k−1, the prime being selected based on a bit processing capability of the processor, the prime being a value approximately equal to (a base 2 raised to a factor)+1, the factor being a value of the bit processing capability of the processor divided by 2;
use the polynomial to identify an original data piece corresponding to the processed data piece; and
combine the original data pieces to provide an original document.

19. The system of claim 18, in which the processor is a 16-bit processor and the prime is $2^8+1$.

20. The system of claim 18, in which the processor is a 32-bit processor and the prime is $2^{16}+1$.

* * * * *

UNITED STATES PATENT AND TRADEMARK OFFICE
CERTIFICATE OF CORRECTION

| | | |
|---|---|---|
| PATENT NO. | : 7,945,784 B1 | Page 1 of 1 |
| APPLICATION NO. | : 11/207358 | |
| DATED | : May 17, 2011 | |
| INVENTOR(S) | : Larry Masinter et al. | |

It is certified that error appears in the above-identified patent and that said Letters Patent is hereby corrected as shown below:

On the Title page, in Item (74), in "Attorney, Agent, or Firm", in column 2, line 1, delete "Lunberg" and insert -- Lundberg --, therefor.

In column 7, line 18, in Claim 1, delete "(base 2" and insert -- (a base 2 --, therefor.

In column 7, line 47, in Claim 8, after "a value" delete "y".

In column 8, line 53, in Claim 18, after "a value" delete "approximately".

Signed and Sealed this
Fifth Day of July, 2011

David J. Kappos
*Director of the United States Patent and Trademark Office*